Oct. 29, 1957
A. WERFELI
2,811,082
PHOTOGRAPHIC OBJECTIVES COMPRISING FIVE COMPONENTS
AXIALLY ALIGNED AND AIR SEPARATED
Filed Nov. 28, 1956
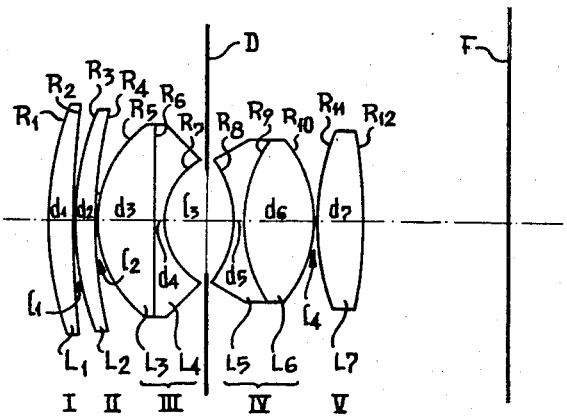
INVENTOR
ARNOLD WERFELI

United States Patent Office 2,811,082
Patented Oct. 29, 1957

2,811,082

PHOTOGRAPHIC OBJECTIVES COMPRISING FIVE COMPONENTS AXIALLY ALIGNED AND AIR SEPARATED

Arnold Werfeli, Yverdon, Switzerland, assignor to Paillard S. A., Sainte-Croix, Switzerland, a corporation of Switzerland Application November 28, 1956, Serial No. 624,817

Claims priority, application Switzerland December 24, 1955

5 Claims. (Cl. 88—57)

The present invention relates to a photographic objective of high luminosity, corrected for aberration of sphericity, coma, astigmatism, distortion, curvature of field and chromatic aberrations, comprising five elements separated by air spaces, the first, second and fifth of said elements being simple convergent lenses, the third and fourth being groups each formed of two lenses cemented together and of which one is divergent, each of the groups constituting a divergent meniscus.

The objective according to the invention differs from known objectives by the fact that the absolute value of the radius of curvature of the rear surface of the second element is between 1.7 and 2.1 times the focal distance of the objective, the absolute value of the radius of curvature of the front surface of the convergent lens of the first group being between 40% and 60% of said focal distance, the radius of curvature of the rear surface of the divergent lens of the same group having an absolute value between 25% and 32% of the focal distance, the absolute value of the radius of curvature of the front surface of the divergent lens of the second group being between 30% and 40% of the said focal distance, the two lenses of said second group being of flint glass.

The figure of the accompanying drawing shows diagrammatically and by way of example, an objective according to the invention.

As shown in the drawing, the objective is comprised of five elements I, II, III, IV and V, separated by air spaces $l_1$, $l_2$, $l_3$ and $l_4$.

The first I, the second II and the last V of the five elements, starting from the object towards the plane of the film F (from left to right in Fig. 1), are each formed by a simple convergent lens $L_1$, $L_2$ and $L_7$. On the contrary the other two elements III and IV located on opposite sides of the diaphragm D are groups, each formed by two cemented lenses $L_3$ and $L_4$, and respectively $L_5$ and $L_6$. The lenses $L_3$ and $L_6$ are convergent, the lenses $L_4$, $L_5$ being divergent. Each of the two groups thus constitutes a divergent meniscus.

The following table gives the numerical values of an objective according to the invention set at a total focal distance $F = 100$ mm., for a relative opening $F \div 1.2$ and an angle of field $\pm 15°$. The radii of curvature of the surfaces are indicated by R, their thickness by $d$, whilst $n_D$ and V indicate respectively the index of refraction for the ray D of the spectre and the constringency of the types of glass used.

| L | | R in mm. | $d, l$ in mm. | $n_D$ | V |
|---|---|---|---|---|---|
| I | $L_1$ | $R_1 = +132.8$ | $d_1 = 9$ | $n_1 = 1.7165$ | $V_1 = 47.9$ |
| | | $R_2 = +386.4$ | $l_1 = 0.2$ | | |
| II | $L_2$ | $R_3 = +117.76$ | $d_2 = 7$ | $n_2 = 1.7165$ | $V_2 = 47.9$ |
| | | $R_4 = +205.64$ | $l_2 = 0.2$ | | |
| III | $L_3$ | $R_5 = +47.76$ | $d_3 = 22$ | $n_3 = 1.64439$ | $V_3 = 47.8$ |
| | $L_4$ | $R_6 = +1436$ | $d_4 = 3.12$ | $n_4 = 1.60608$ | $V_4 = 37.9$ |
| | | $R_7 = +27.36$ | $l_3 = 26$ | | |
| IV | $L_5$ | $R_8 = -38.6$ | $d_5 = 4$ | $n_5 = 1.75605$ | $V_5 = 27.5$ |
| | $L_6$ | $R_9 = +57.6$ | $d_6 = 28$ | $n_6 = 1.72078$ | $V_6 = 50.31$ |
| | | $R_{10} = -49.92$ | $l_4 = 0.2$ | | |
| V | $L_7$ | $R_{11} = +99.2$ | $d_7 = 17.68$ | $n_7 = 1.74439$ | $V_7 = 44.9$ |
| | | $R_{12} = -196.8$ | | | |

As will be seen from the above table, the conditions set by the invention are satisfied, that is to say $$1.7\ F < R_4 < 2.1\ F$$
$$0.4\ F < R_5 < 0.6\ F$$
$$0.25\ F < R_7 < 0.32\ F$$
$$0.3\ F < R_8 < 0.4\ F$$

On the other hand, the above objective has the following features:

$$2\ F < R_2 < 5\ F$$
$$0.4\ F < -R_{10} < 0.7\ F$$
$$10\ F < R_6 < \infty$$
$$0.5\ F < R_9 < 0.75\ F$$
$$-R_{12} > 1.5\ R_{11}$$

$$\frac{n_5 + n_6 + n_7}{3} > 1.70$$

$$n_5 - n_4 \geq 0.12$$

I claim:

1. A photographic objective of high luminosity, corrected for aberration of sphericity, coma, astigmatism, distortion, curvature of field and chromatic aberrations, comprising five elements separated by air spaces, the first, second and fifth of said elements being simple convergent lenses, each of the third and fourth of said elements being groups, each of said groups being formed by two lenses, one of said lenses being divergent, each of said groups constituting a divergent meniscus, the absolute value of the radius of curvature of the rear surface of said second element being between 1.7 and 2.1 times the focal distance of said objective, the absolute value of the radius of curvature of the front surface of the convergent lens of the first group being between 40% and 60% of said focal distance, the radius of curvature of the rear surface of the divergent lens of the same group having an absolute value between 25% and 32% of the focal distance, the absolute value of the radius of curvature of the front surface of the divergent lens of the second group being between 30% and 40% of said focal distance, the two lenses of said second group being of flint glass.

2. An objective according to claim 1, wherein the absolute value of the radius of curvature of the rear surface of the first element is between 2 and 5 times the focal distance of said objective, the radius of curvature of the rear surface of the convergent lens of said second group having a value between 40% and 70% of said focal distance.

3. An objective according to claim 1, wherein the radius of curvature of the rear surface of said fifth element is, in absolute value, 1.5 times larger than the radius of curvature of the front surface of said fifth element.

4. An objective according to claim 1, wherein the absolute value of the radius of cementing of the lenses of said first group is between 10 times the focal distance of the objective and infinity, the radius of cementing of the lenses of the second group being an absolute value between 50% and 75% of said focal distance.

5. A photographic objective of high luminosity, corrected for aberration of sphericity, coma, astigmatism, distortion, curvature of field and chromatic aberrations, comprising five elements separated by air spaces, the first, second and fifth of said elements being simple convergent lenses, each of the third and fourth of said elements being a first group and a second group, respectively, each of said first group and of second group being formed by two cemented lenses having a radius of cementing, one of said lenses of each group being divergent, each of said groups constituting a divergent meniscus, the absolute value of the cemented radius of the lenses of said first group being between 10 times the focal distance of the objective and infinity, the cemented radius of the lenses of said second group being an absolute value between 50% and 75% of said focal distance, the index of refraction of the glass of said divergent lens of said second group being at least 0.12 larger than the index of refraction of the glass of said divergent lens of said first group, the absolute value of the radius of curvature of the rear surface of said second element being between 1.7 and 2.1 times the focal distance of said objective, the absolute value of the radius of curvature of the front surface of the convergent lens of said first group being between 40% and 60% of said focal distance, the radius of curvature of the rear surface of the divergent lens of said first group having an absolute value between 25% and 32% of the focal distance, the absolute value of the radius of curvature of the front surface of the divergent lens of said second group being between 30% and 40% of said focal distance, the two lenses of said second group being of flint glass.

References Cited in the file of this patent

UNITED STATES PATENTS

| | | |
|---|---|---|
| 2,012,822 | Lee | Aug. 27, 1935 |
| 2,319,171 | Warmisham et al. | May 11, 1943 |
| 2,379,393 | Wynne | June 26, 1945 |
| 2,701,982 | Angenieux | Feb. 15, 1955 |

FOREIGN PATENTS

| | | |
|---|---|---|
| 544,658 | Great Britain | Apr. 22, 1942 |